United States Patent [19]

Hirose et al.

[11] Patent Number: 4,740,113

[45] Date of Patent: Apr. 26, 1988

[54] RECEIVING/DELIVERING APPARATUS FOR ROD-SHAPED OBJECTS TRANSPORTED BY AN AIR FLOW

[75] Inventors: Ichiro Hirose, Tokyo; Takayoshi Sagawa, Hiratsuka; Shichisei Tani, Hiratsuka; Katsuo Kato, Hiratsuka, all of Japan

[73] Assignee: Japan Tobacco, Inc., Tokyo, Japan

[21] Appl. No.: 910,664

[22] Filed: Sep. 23, 1986

[51] Int. Cl.⁴ .............................................. B65G 53/44
[52] U.S. Cl. ............................... 406/70; 406/82; 131/282
[58] Field of Search .................. 406/23, 33, 70, 77, 406/79, 82, 83; 198/457, 461, 524, 725; 131/282, 283

[56] References Cited

U.S. PATENT DOCUMENTS

| | | | |
|---|---|---|---|
| 2,329,184 | 9/1943 | Cann | 198/725 X |
| 3,608,972 | 9/1971 | Rudszinat | 406/82 X |
| 3,827,545 | 8/1974 | Buhayar | 198/461 |
| 4,084,685 | 4/1978 | Hollenton et al. | 198/524 X |
| 4,372,710 | 2/1983 | Kasparek et al. | |
| 4,618,293 | 10/1986 | Heitmann | 406/70 X |

FOREIGN PATENT DOCUMENTS

| | | |
|---|---|---|
| 1251238 | 9/1967 | Fed. Rep. of Germany . |
| 2306096 | 8/1974 | Fed. Rep. of Germany . |
| 2929406 | 2/1981 | Fed. Rep. of Germany . |
| 1155952 | 7/1966 | United Kingdom . |
| 2070545 | 2/1981 | United Kingdom . |
| 2140379 | 5/1984 | United Kingdom . |

*Primary Examiner*—Sherman D. Basinger
*Assistant Examiner*—James M. Kannofsky
*Attorney, Agent, or Firm*—Nixon & Vanderhye

[57] ABSTRACT

A receiving/delivering apparatus for rod-shaped objects, according to the present invention, comprises a transport trough having a guide groove for guiding the objects by transported by an air current, a driving pulley located over the groove, first and second driven pulley located over the guide groove, respectively, on the upper-course side of the driving pulley with respect to the transportation direction of the objects, an endless rubber belt stretched between the driving pulley and the first driven pulley, the belt including a belt portion between the driving pulley and the first driven pulley, and running in the same direction as the transportation direction, the belt portion having a parallel portion between the first and second driven pulleys, and adapted to be in contact with the objects in the guide groove, and a slanting portion inclined at a predetermined angle, so as to be more distant from the guide groove than from the second driven pulley, and a pair of acceleration rollers positioned beside that end portion of the transport trough on the lower-course side with respect to the transportation direction.

9 Claims, 11 Drawing Sheets

F I G. 12
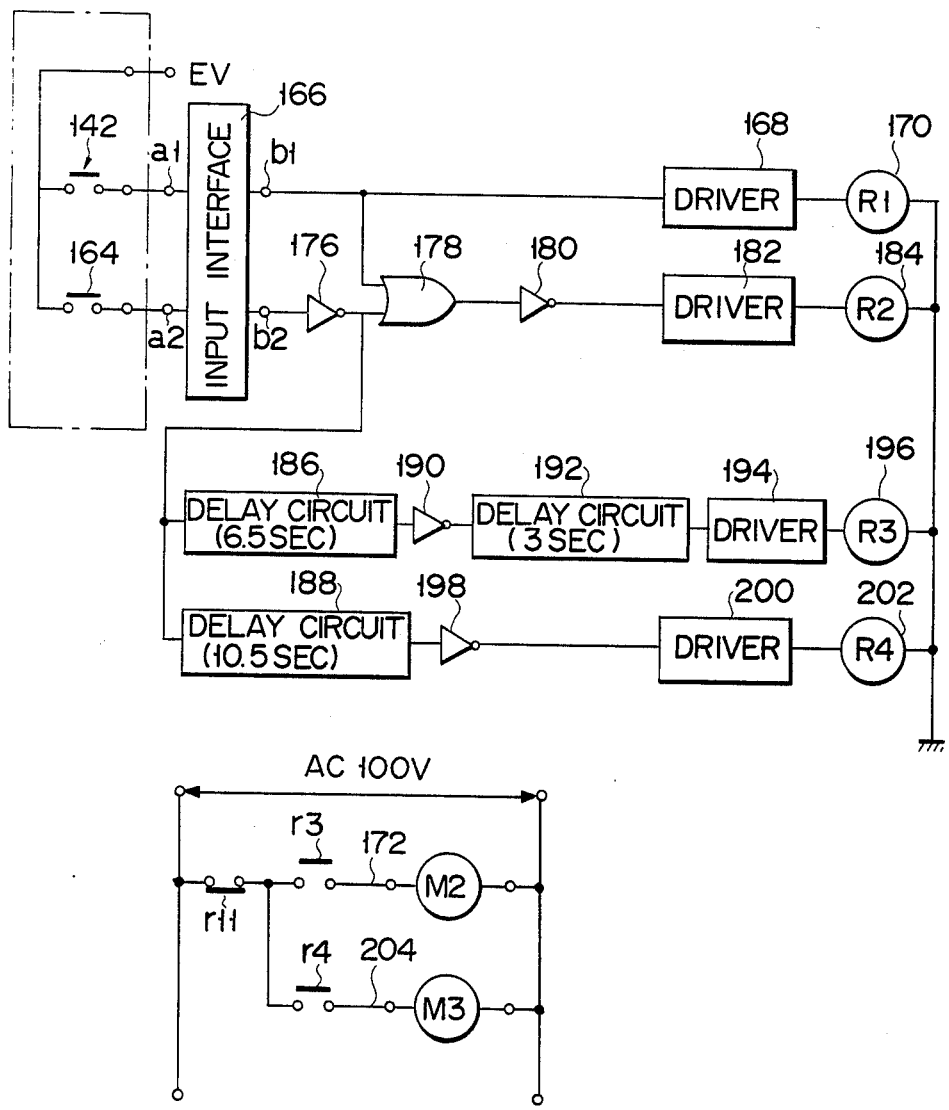

RECEIVING/DELIVERING APPARATUS FOR ROD-SHAPED OBJECTS TRANSPORTED BY AN AIR FLOW

BACKGROUND OF THE INVENTION

The present invention relates to an apparatus for receiving rod-shaped objects transported by an air flow, and delivering the received objects with a predetermined timing.

Receiving/delivering apparatuses for rod-shaped objects, are used, for example, in systems for manufacturing filter cigarettes. These manufacturing systems generally comprise a filter manufacturing unit for making filter rods, a cigarette manufacturing unit for producing plain cigarettes, and a plug assembler for making filter cigarettes from the filter rods and plain cigarettes fed from the manufacturing units. Usually, the filter manufacturing unit and the plug assembler are arranged separately, so that a transportation system is interposed between them, whereby the filter rods manufactured by the former are transported to the latter. The transport system comprises a feeder unit, a transport pipe, and a receiving/delivering unit. The feeder unit serves to deliver the filter rods successively from a hopper which is provided in the filter manufacturing unit. The transport pipe, one end of which is connected to the feeder unit, receives the rods from the feeder unit, and transports them in a current of compressed air therein. The receiving/delivering unit, which is connected to the other end of the transport pipe, receives the filter rods transported through the pipe by the air current therein, and then delivers them toward another hopper, in the plug assembler. In the hopper of the plug assembler, the rods must be stored regularly. In feeding the filter rods into the hopper of the plug assembler, therefore, the individual rods must be transported transversely or at right angles to their longitudinal axis, lest the rods be oriented irregularly. Thus, it is necessary to change the transportation direction of the filter rods, fed longitudinally through the transport pipe, to the transverse direction, for cross-feeding. To this end, a turnabout unit is located between the receiving/delivering unit and the plug assembler, whereby the rods are reoriented for cross-feeding. Accordingly, the receiving/delivering unit must deliver the rods intermittently toward the turnabout unit, so as to be timed to the operation of the turnabout unit.

To cope with this, the receiving/delivering unit is provided with a regulating mechanism for regulating the transfer speed of the filter rods delivered from the transport pipe. Conventionally, the regulating mechanism includes a pair of regulating rollers, which, having their peripheral surfaces opposed to each other, are rotated in opposite directions. A V-shaped groove is formed on the peripheral surface of each regulating roller. Thus, a speed-regulating path for the filter rods is defined between the regulating rollers, by the V-shaped grooves on the respective peripheral surfaces of the rollers. When the filter rods delivered from the transport pipe, pass through the regulating path between the regulating rollers, therefore, the transport speed of the rods can be regulated by a frictional force produced between the rods and the rollers. Thus, the rods, thereafter, are transported at a speed which is determined by the peripheral speed of the regulating rollers.

The receiving/delivering unit is further provided with a pair of acceleration rollers which are arranged between the regulating mechanism and the turnabout unit. Resembling the regulating rollers, the acceleration rollers differ from them only in that their peripheral speed is higher than that of the regulating rollers. With use of such acceleration rollers, the filter rods, fed from the regulating rollers, can be delivered more quickly to the turnabout unit. In consequence, the turnabout unit can receive the rods intermittently, in accordance with its operation timing.

According to the prior art receiving/delivering apparatus described above, however, the transfer speed of the filter rods, delivered from the transport pipe, sometimes cannot be regulated securely, due to slippage between the peripheral surfaces of the regulating rollers and the outer surface of each rod. It is therefore difficult to feed the rods securely from the acceleration rollers to the turnabout unit, with a predetermined timing. Thus, the turnabout unit may become jammed by the rods.

SUMMARY OF THE INVENTION

The object of the present invention is to provide a receiving/delivering apparatus for rod-shaped objects, capable of receiving the objects transported by an air current, and then delivering them securely and smoothly, in an intermittent manner.

The above object of the present invention is achieved by a receiving/delivering apparatus for rod-shaped objects transported by an air current, which comprises an elongated transport trough for receiving the objects transported by the air current, the trough having a guide groove extending in the longitudinal direction thereof and open at both ends, whereby the objects are received and guided during transportation; regulating means for regulating the transportation speed of the objects transported in the guide groove by the air current, the regulating means including a driving pulley located over the guide groove, a first driven pulley located over the guide groove, on the upper-course side of the driving pulley with respect to the transportation direction of the objects transported by the air current, a second driven pulley located between the driving pulley and the first driven pulley, and an endless rubber belt stretched between the driving pulley and the first driven pulley, the belt including a belt portion located close to that portion of the guide groove between the driving pulley and the first driven pulley, and running in the same direction as the transport direction, the belt portion having a parallel portion, extending parallel to the guide groove between the first and second driven pulleys, and adapted to be in contact with the objects being transported in the guide groove, and a slanting portion extending between the second driven pulley and the driving pulley and inclined at a predetermined angle, so as to be more distant from the guide groove than from the second driven pulley; and a pair of acceleration rollers positioned beside that end portion of the transport trough on the lower-course side, with respect to the transportation direction, and adapted to accelerate the delivery of the objects delivered from the trough, the acceleration rollers defining therebetween an acceleration path through which the objects are passed.

According to the receiving/delivering apparatus of the invention, as described above, when the rod-shaped objects transported by the air current, are received in the transport trough, they are brought into contact with the parallel portion of the rubber belt of the regulating means. By this contact, the movement of the objects in the trough is regulated. In other words, the objects are transported in the guide groove of the trough, at a speed determined by the running speed of the rubber belt. In this case, a large frictional force is produced by the contact between the belt and the objects. Moreover, the frictional force can be adjusted to a desired magnitude, by vertically moving the first and second pulleys. Thus, the transportation speed of the objects transported by the air current, can be regulated effectively by adjusting the belt.

As the parallel portion of the rubber belt runs, the rod-shaped objects are transported in the guide groove of the transport trough, and then delivered toward the acceleration path defined between the accelerating rollers. In this case, the objects can be guided smoothly into the acceleration path. When the trailing end of each object, with respect to its transfer direction in the guide groove of the trough, passes the second driven pulley, the leading end of the object is subjected to an urging force to lift it up. However, the leading end is prevented from lifting, by the slanting portion of the belt. Thus, the objects can be guided accurately into the acceleration path and therefore, prevented from becoming jammed between the trough and the acceleration rollers.

BRIEF DESCRIPTION OF THE DRAWINGS

FIGS. 12 and 13 are control circuit diagrams of the transport system of FIG. 1.

DETAILED DESCRIPTION OF THE PREFERRED EMBODIMENTS

Figure 1:
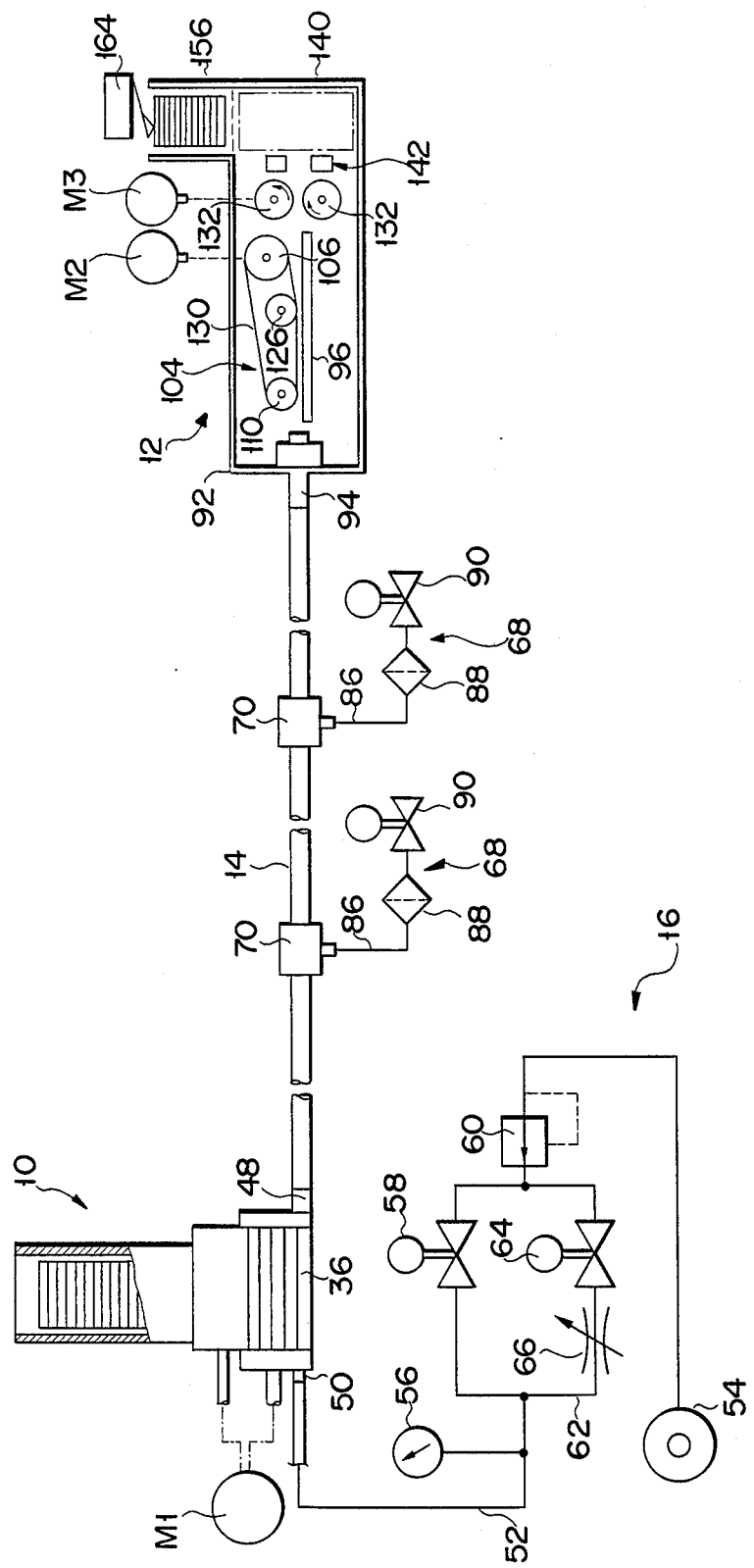
FIG. 1 is a schematic view showing an outline of a transport system according to an embodiment of the present invention.

Referring now to FIG. 1, a transport system for filter rods is shown, which is used in the manufacture of filter cigarettes. This system comprises rod feeder unit 10; rod-receiving unit 12 located at a substantial distance from feeder unit 10; transport pipe 14 which connects units 10 and 12 and serves to transport the filter rods via an air flow; and blower unit 16 for circulating compressed air from unit 10 toward unit 12, through pipe 14.

Figure 2:
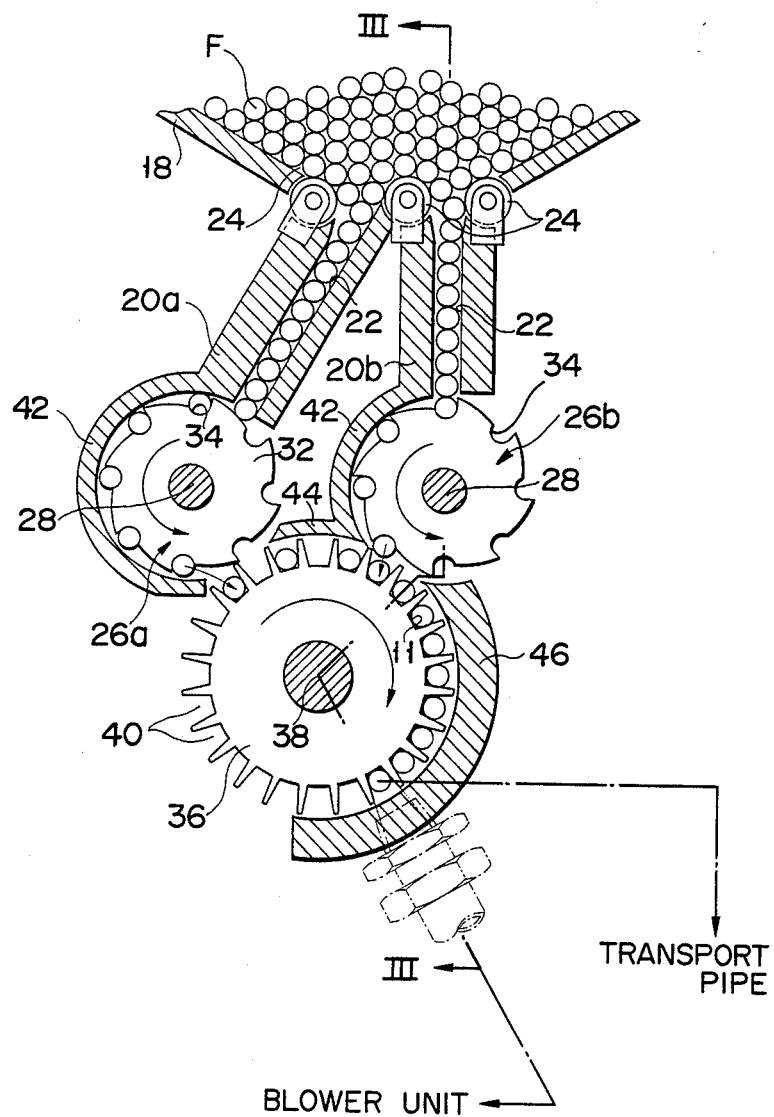
FIG. 2 is a sectional view of a feeder unit shown in FIG. 1.
Figure 3:
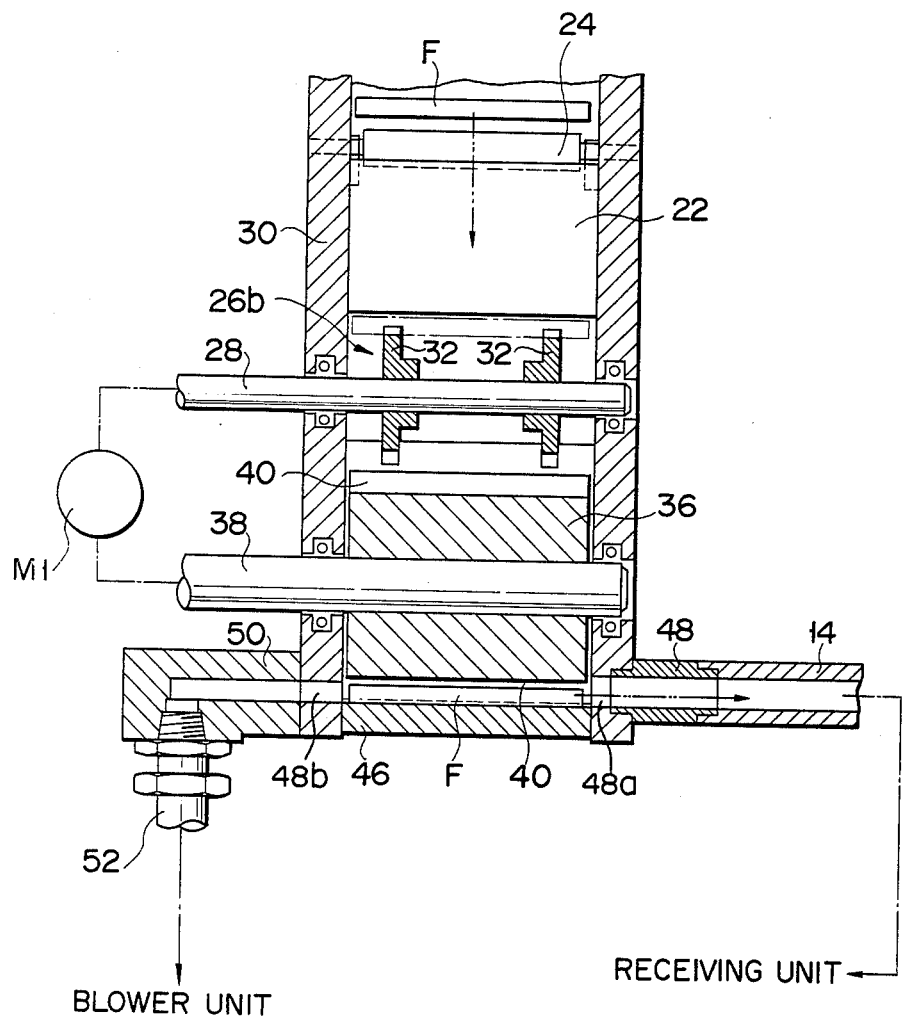
FIG. 3 is a sectional view taken along line III—III of FIG. 2.

Feeder unit 10 can be seen most clearly in FIGS. 2 and 3. It includes feeding hopper 18, in which a number of filter rods F are stored. Rods F are manufactured by a filter rod manufacturing machine (not shown), and each rod F has a length equivalent to the combined length of several filter tips used in filter cigarettes. Two takeout guides 20a and 20b are connected to the bottom portion of hopper 18. Delivery passage 22 is defined in each of guides 20a and 20b. The upper end of each passage 22 opens into hopper 18. Passages 22 extend downward from hopper 18, so that their lower ends open onto the lower ends of their corresponding takeout guides. Each passage 22 has a size and shape such that filter rods F, taken out one-by-one from hopper 18, are delivered successively from the lower end opening of the passage. Guide rollers 24, for example, three in number, are arranged at the upper ends of takeout guides 20a and 20b, whereby rods F are smoothly guided, one after another, into passages 22. In this embodiment, roller 24 in the center, as in FIG. 2, is a common guide roller for both passages 22. Each roller 24 is rotatably mounted on a support arm, which preferably is swingably attached to its corresponding takeout guide.

Distribution wheels 26a and 26b are arranged under their corresponding takeout passages 22. They are mounted individually on shafts 28, which are spaced horizontally at a predetermined distance from each other. Shafts 28 are rotatably supported by housing 30 of feeder unit 10, and coupled to feed motor M1 (FIG. 3) by means of a transmission mechanism (not shown). Thus, wheels 26a and 26b are rotated in a counterclockwise direction, as indicated by arrows in FIG. 2, by motor M1.

As can be seen from FIG. 3 showing distribution wheel 26b, each wheel includes a pair of rotating disks 32, which are mounted axially on shafts 28, at a predetermined distance from each other. A plurality of takeout grooves 34 are formed on the peripheral surface of each disk 32, arranged circumferentially at regular intervals. As disks 32 or wheels 26 rotate, each two combined grooves 34 of each pair of disks 32, in cooperation with each other, can successively receive one of filter rods F from their corresponding delivery passage 22. After it is received and held in the two of grooves 34, rod F is transported as the distribution wheels rotate.

Delivery drum 36 is located under distribution wheels 26a and 26b. Like wheels 26, drum 36 is mounted on shaft 38, which is rotatably supported by housing 30, so as to extend parallel to shafts 28. Drum 36 is in rolling contact with wheels 26a and 26b, so that it is rotated clockwise or in the direction opposite to the rotating direction of the wheels. Like shafts 28, shaft 38 of drum 36 is coupled to feed motor M1 by means of a transmission mechanism (not shown).

A plurality of transport grooves 40 are formed on the peripheral surface of delivery drum 36, arranged circumferentially at regular intervals. Drum 36 rotates while receiving, in its grooves 40, filter rods F which, held in takeout grooves 34 of distribution wheels 26a and 26b, are transported to the drum as the wheels rotate. Rods F from wheel 26a are fed into alternate grooves 40 of drum 36, while those from wheel 26b are received in the remaining alternate transport grooves. Thus, after grooves 40 of drum 36 have run past both wheels 26a and 26b, they securely hold therein the filter rods fed from either wheel. After being received in this manner, in grooves 40 of drum 36, filter rods F are transported as drum 36 rotates.

On the outside of distribution wheels 26a and 26b, as shown in FIG. 2, a pair of guide walls 42 extend from the lower ends of their corresponding takeout guides 20. Walls 42 cover part of the outer peripheral surfaces of their corresponding wheels 26a and 26b, and serve to guide filter rods F being transported. Through the use of these guide walls, rods F can be transferred securely from wheels 26a and 26b to delivery drum 36, without slipping off the wheels. Guide walls 44 and 46 are also arranged outside drum 36. Covering part of the outer peripheral surface of drum 36, walls 44 and 46 have the same function as walls 42. Wall 44 extends integrally from the lower end of wall 42 for wheel 26b. Wall 46 serves to hold and guide filter rods F in transport grooves 40 of drum 36, having passed wheel 26b.

As shown in FIG. 3, one end of transport pipe 14 is connected to delivery connector 48, formed of a pipe member, which is attached to the lower portion of housing 30. Extending parallel to the axis of delivery drum 36 or each transport groove 40 thereof, connector 48 can connect with one end of one of grooves 40, by means of through hole 48a bored through the wall of housing 30. In other words, as drum 36 rotates, its transport grooves 40 communicate successively, at one end thereof, with connector 48 or transport pipe 14. Housing 30 is fitted with air connector 50 formed of a pipe member. When delivery connector 48 connects with the one end of transport groove 40, connector 50 communicates with the other end of groove 40, by means of a through hole 48a in the wall of housing 30. Connector 50 is connected to blower unit 16. As shown in FIG. 1, unit 16 is provided with blast duct 52, one end of which is connected to connector 50. The other end of duct 52 is connected to compressed-air source 54. Duct 52 is fitted with pressure gauge 56, main solenoid valve 58, and pressure-regulating valve 60, arranged in succession. Also, duct 52 is connected with by-pass line 62, by-passing valve 58. Line 62 is provided with sub-solenoid valve 64 and throttle valve 66 which is located on the lower-course side of valve 64, with respect to the direction of the air flow.

Thus, according to blower unit 16, described above, when main solenoid valve 58 is open, compressed air, delivered from compressed air source 54, is adjusted to a predetermined pressure by pressure-regulating valve 60. Thereafter, the air is fed into air connector 50 via valve 58, and then delivered into transport pipe 14, through feeder unit 10. Thus, when transport grooves 40 of delivery drum 36 of unit 10, individually holding filter rods F therein, are located successively between connectors 48 and 50, as drum 36 rotates, the rods are discharged one after another, from grooves 40 into connector 48, by compressed air jetted from connector 50 and flowing through pipe 14. Then, rods F are transported from delivery connector 48 toward receiving unit 12, through pipe 14. The above description is related only to the fundamental operation of blower unit 16. More specific operations of unit 16 will be described in detail later.

Transport pipe 14 is provided with two pressure relief units 68, which are used to release the compressed air from transport pipe 14 into the atmosphere. Units 68 are located so that if pipe 14 is 160 meters long, for example, one of units 68 is at a distance of 30 meters from receiving unit 12, and the other at a distance of 60 meters from unit 12.

Figure 4:
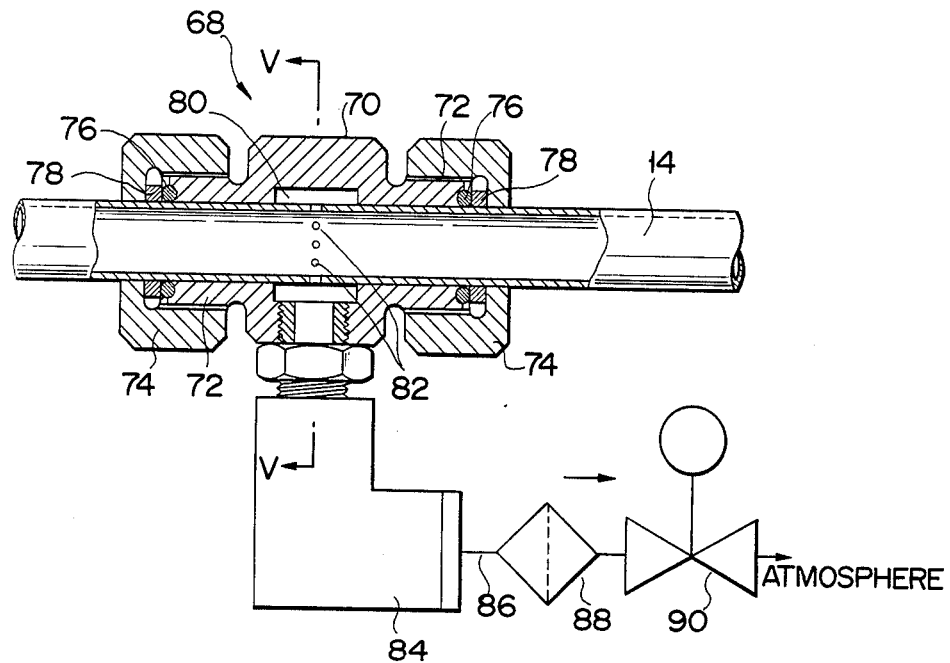
FIG. 4 is an enlarged view, partially in section, of a releasing unit shown in FIG. 1.
Figure 5:
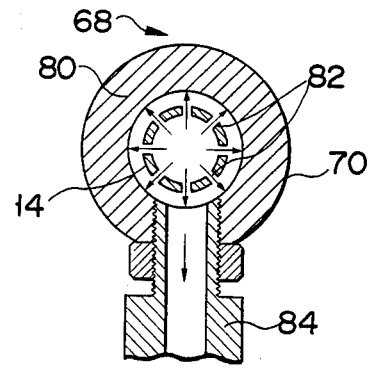
FIG. 5 is a sectional view taken along line V—V of FIG 4.

Pressure relief units 68 can best be seen from FIGS. 4 and 5. Since they have the same construction, only one of them will be described below. Unit 68 includes pipe member 70 mounted on the outer peripheral surface of transport pipe 14. Screw portion 72 is formed at each end of member 70, and cap nut 74 is screwed onto portion 72. Also, O-ring 76 is provided at each end of member 70, and is held by retaining ring 78, which is interposed between each end face of member 70 and the inner end face of each corresponding nut 74.

Annular groove 80 is defined between the inner peripheral surface of the central portion of pipe member 70, as viewed in the axial direction thereof and the outer periphery of transport pipe 14. On the other hand, transport pipe 14 is formed with a plurality of communication holes 82 which connect with groove 80. As shown in FIGS. 4 and 5, holes 82 are distributed at regular intervals in the circumferential direction of pipe 14. L-shaped connector pipe 84 is screwed into pipe member 70. One end of pipe 84 is always connected to groove 80 of member 70, while the other end is connected to pressure relief pipe 86. Pipe 86 is fitted with filter 88 and solenoid-operated relief valve 90. Normally, valve 90 is closed. Pressure relief pipe 86 terminates in an open end which always opens into the atmosphere.

Figure 6:
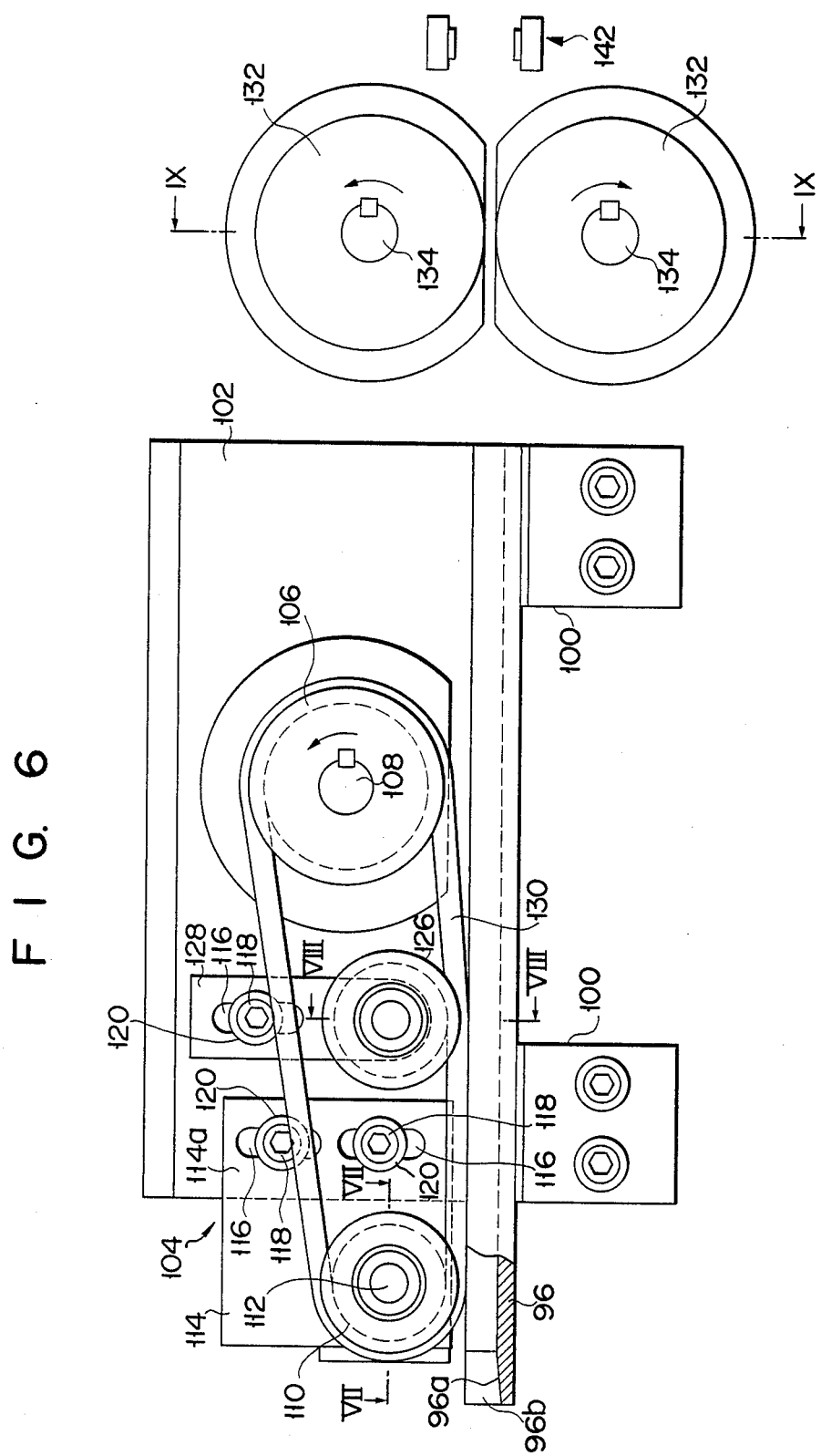
FIG. 6 is a side view showing part of a receiving unit shown in FIG. 1.

As can be seen from FIG. 1, the other end of transport pipe 14 is connected to receiving unit 12. Unit 12 includes housing 92, which is fitted with receiving connector 94 formed of a pipe member. Connected to the other end of pipe 14, connector 94 projects into housing 92. As is best illustrated in FIG. 6, one end of transport trough 96 is located close to the projecting end of connector 94. Trough 96 defines the transport path for filter rods F. Open at both ends, the trough extends horizontally, in a straight line with pipe 14. As can be seen from FIG. 6, the bottom wall of trough 96 has slanting surface 96a declining toward connector 94. Also, each side wall of the transport path has slanting surface 96b, at one end portion thereof, so that the respective end portions of the two side walls recede from each other toward one end thereof. Thus, with slanting surfaces 96a and 96b formed at the one end portion of trough 96, filter rods F, transported through pipe 14 and discharged from connector 94, can be securely guided into the transport path of trough 96.

Figure 7:
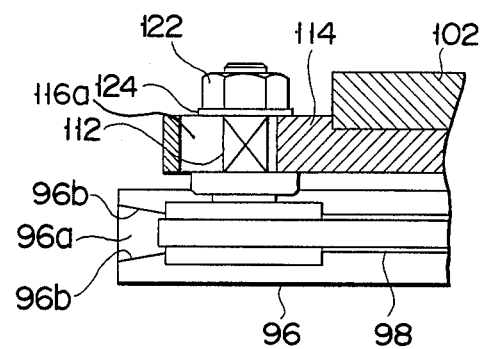
FIG. 7 is a sectional view taken along line VII—VII of FIG. 6.
Figure 8:
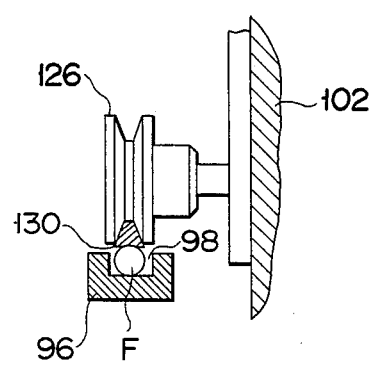
FIG. 8 is a sectional view taken along line VII—VII of FIG. 6.

As can be seen from FIG. 6, transport trough 96 is supported by a pair of supports 100. These supports also support side plate 102, which lies parallel to trough 96. Plate 102 is fitted with regulating mechanism 104 for regulating the speed of transport of filter rods F, fed into the transport path of trough 96. Mechanism 104 includes driving pulley 106, which is located on the other end side of, and overlying trough 96, with respect to its center as viewed in its axial direction. Pulley 106 has driving shaft 108, which is rotatably supported on side plate 102. Shaft 108 is coupled to motor M2 (FIG. 1), whereby shaft 108 and therefore, pulley 106 are rotated in the counterclockwise direction of FIG. 6. Overlying transport trough 96, moreover, first driven pulley 110 is located close to the one end of the trough. Pulley 110 is rotatably supported by shaft 112, which is supported by a portion of movable plate 114 projecting from one side portion of side plate 102. Plate 114 is mounted on plate 102, for vertical movement. The movable plate includes portion 114a which, overlapping the side plate, is formed with a pair of slots 116. Slots 116 are located on the same line perpendicular to the axis of trough 96. Side plate 102 is formed with a pair of through holes (not shown) corresponding to slots 116. Fitting screw 118 is passed through each slot 116, with the aid of washer 120. Screws 118 project on the rear side of plate 102 through the through holes therein. The projecting ends of screws 118 are individually screwed into nuts (not shown). Thus, movable plate 114 is rigidly attached to side plate 102, by means of screws 118 and the nuts. By loosening the nuts, plate 114 can be moved vertically for a distance equivalent to the length of each slot 116. Accordingly, the vertical position of first driven pulley 110 can be adjusted by moving the movable plate. The position of pulley 110 is adjustable also with respect to the axial direction of transport trough 96. As is shown in FIG. 7, shaft 112 of pulley 110 projects on the rear side of plate 114, through a slot 116a bored through plate 114 and extending in the axial direction of trough 96. The projecting end portion of shaft 112 is threaded, thus forming a screw portion, and nut 122 is mounted on the screw portion, with the aid of washer 124.

Second driven pulley 126 which has the same diameter as first driven pulley 110 is located between driving pulley 106 and first driven pulley 110. Pulley 126 is mounted on side plate 102, by means of movable plate 128 which has the same function as movable plate 114 for pulley 110. Plate 128 is also formed with a slot 116, and mounted on side plate 102 by means of fitting screw 118, washer 120, and a nut. Thus, pulley 126, like pulley 110, can be adjusted in its vertical position, by moving the movable plate.

Endless rubber belt 130, having a V-shaped cross section, is stretched between driving pulley 106 and first driven pulley 110, so as to surround second driven pulley 126. Tension on belt 130 can be easily adjusted by moving pulley 110 in the axial direction of transport trough 96. The two driven pulleys are located at the same level. A horizontal portion of belt 130, between driven pulleys 110 and 126, is positioned so that its underside is in contact with filter rods F, introduced into trough 96. Such positioning can be effected by vertically moving movable plates 114 and 128, relative to side plate 102, in the aforesaid manner.

In this embodiment, that part of rubber belt 130 extending between second driven pulley 126 and driving pulley 106, constitutes a slanting portion which ascends, at a predetermined angle, toward the other end of transport trough 96.

Figure 9:
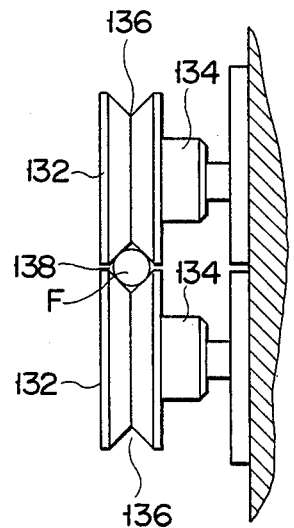
FIG. 9 is a sectional view taken along line IX—IX of FIG. 6.

A pair of accelerating rollers 132, spaced vertically, are arranged beside the other open end of transport trough 96. Rollers 132 have their respective driving shafts 134, which are connected to accelerating motor M3 (FIG. 1) by means of a transmission mechanism (not shown). Thus, shafts 134, and hence rollers 132, are rotated in opposite directions, as indicated by arrows in FIG. 6. As can be seen from FIG. 9, V-shaped annular groove 136 is formed on the peripheral surface of each roller 132. Thus, aperture 138, surrounded by grooves 136 of rollers 132, is defined between the respective peripheral surfaces of rollers 132, adjoining each other. Aperture 138, which is located coaxially with transport path 98 of transport trough 96, has a size such that filter rods F can pass through the aperture.

The peripheral speed of accelerating rollers 132 is substantially higher than the running speed of rubber belt 130; for example, the former may be about 1.8 times as high as the latter. The distance from second driven pulley 126 to aperture 138 between rollers 132, is a little longer than the length of each filter rod F.

Through the use of transport trough 96, regulating mechanism 104, and accelerating rollers 132, as described above, filter rods F, transported successively through transport pipe 14, by the flow of compressed air, are ejected from connector 94 into trough 96. When introduced into trough 96, rods F are urged to move toward rollers 132, at a predetermined speed, along the transport path, by the compressed air jetted from connector 94. When one of rods F is on the point of passing regulating mechanism 104, it is in contact with the underside of rubber belt 130 of mechanism 104. Therefore, the transfer speed of rod F is adjusted to a fixed speed, depending on the running speed of belt 130. Thus regulated in its moving speed by belt 130, the filter rod is transported along trough 96, toward accelerating rollers 132, in synchronism with the running belt, until it passes second driven pulley 126.

Immediately after the trailing end of each filter rod F (with respect to its transfer direction) passes pulley 126, the leading end of the rod enters aperture 138, defined between paired accelerating rollers 132. As rollers 132 rotate, therefore, rod F is accelerated in movement, and fed into a turnabout unit in the next stage, which will be described in detail later. As was mentioned before, the peripheral speed of rollers 132 is substantially higher than the running speed of rubber belt 130. Accordingly, a predetermined distance is maintained between each rod F passing between rollers 132, and its immediate successor, due to the difference in the two speeds. Thus, filter rods F are fed intermittently to the turnabout unit, after passing through regulating mechanism 104 and rollers 132.

In this embodiment, regulating mechanism 104 is constructed so that the portion of rubber belt 130 between second driven pulley 126 and driving pulley 106 is inclined upward at a predetermined angle. Therefore, that portion of belt 130 never exerts an adverse influence on the acceleration of the movement of filter rods F, by accelerating rollers 132. Also, the slanting portion of belt 130 allows the leading end of each rod F to be guided smoothly into aperture 138, between rollers 132. If belt 130 has no such slanting portion, pressure from rubber belt 130 acts only on the trailing end of rod F when the trailing end passes pulley 126. As a result, the leading end of rod F is lifted, so that it cannot easily be fed smoothly into aperture 138. If it is provided with the slanting portion, however, belt 130 can effectively restrain the leading end of rod F from rising, thus permitting its smooth insertion into aperture 138. According to regulating mechanism 104, as described above, a strong frictional force can be produced between rubber belt 130 and filter rods F.

Accordingly, a braking force can be applied effectively to rods F, thus ensuring the intermittent feed of rods F to the turnabout unit.

Figure 10:
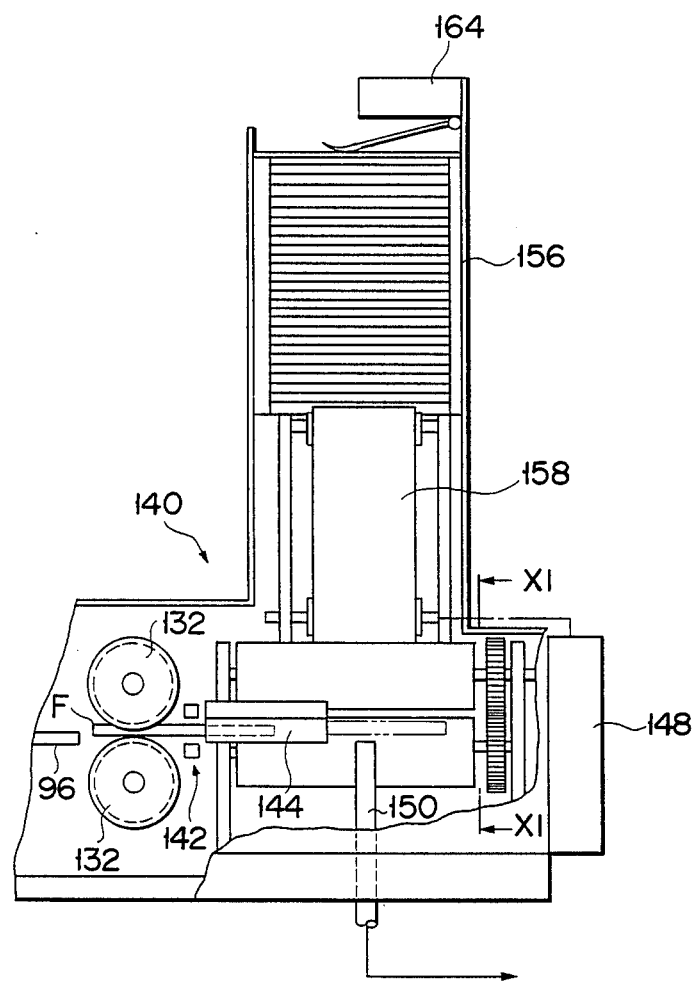
FIG. 10 is a side view of a turnabout unit shown in FIG. 1.
Figure 11:
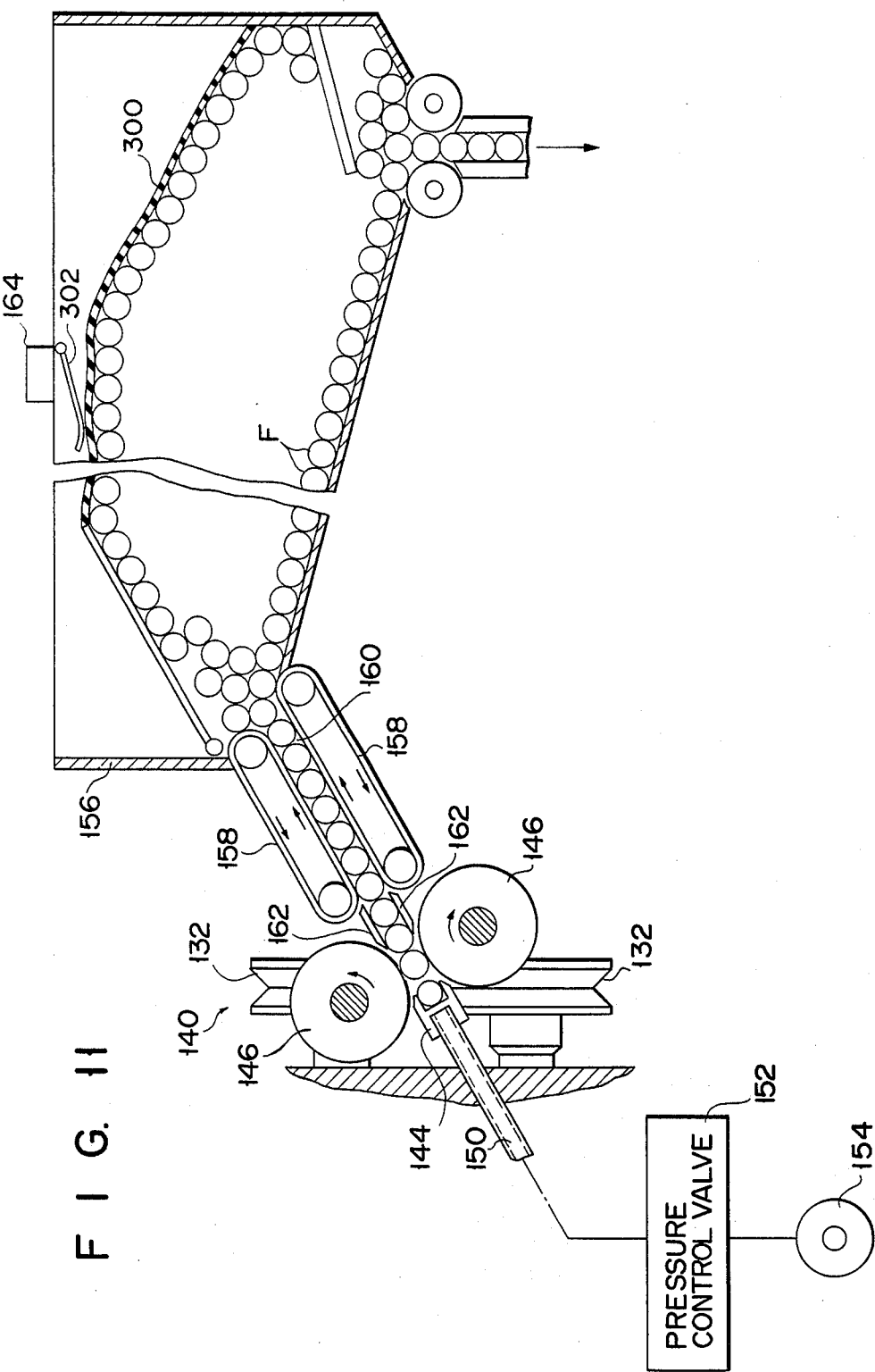
FIG. 11 is a sectional view showing part of the unit of FIG. 10.

FIGS. 10 and 11 show turnabout unit 140 in detail. Before describing unit 140, however, detecting switch 142 which serves to detect a jam of filter rods F in their course of transfer, will be explained first. As can be seen from FIGS. 1, 6, and 10, switch 142 is located between unit 140 and accelerating rollers 132. The switch includes, for example, light-emitting element and light-sensing element which face each other, with the course of transfer between them. Constructed in this manner, detecting switch 142 produces a jam signal if an optical signal is prevented from being transmitted from emitting element to sensing element, for a predetermined period of time, by any of rods F remaining between unit 140 and rollers 132.

Turnabout unit 140 includes receiving trough 144, which is located near accelerating rollers 132. Trough 144, which is open at both ends, can receive filter rods F delivered intermittently from rollers 132, in the aforesaid manner. Trough 144 has a function similar to that of transport trough 96, and is located on the extension of the axis of trough 96. In this embodiment, as seen from FIG. 11, the receiving trough is positioned so that its elongated opening, extending along its axis, faces diagonally upward.

A pair of delivery rollers 146 are arranged near the upward opening of receiving trough 144, extending parallel thereto. Rollers 146 face each other, with the opening of trough 144 between them, and are spaced such that filter rods F can pass between rollers 146. As can be seen from FIG. 10, moreover, rollers 146 extend a considerable distance beyond the leading end of receiving trough 144, with respect to the transport direction of filter rods F, delivered by accelerating rollers 132. Rollers 146 are rotated in opposite directions, as indicated by arrows in FIG. 11. In FIG. 10, numeral 148 designates a drive mechanism for rollers 146.

Air nozzle 150 is located near the leading end of receiving trough 144, whereby compressed air is jetted toward the gap between delivery rollers 146. The nozzle is connected to compressed-air source 154 via pressure control valve 152.

As is shown in FIG. 11, receiving hopper 156 is positioned diagonally above delivery rollers 146. A pair of conveyor belts 158 are arranged between hopper 156 and rollers 146, extending diagonally upward and parallel to each other. The extending direction of the conveyor belts crosses the axis of receiving trough 144. Conveyor belts 158 are driven in the directions indicated by arrows in FIG. 11, by drive mechanism 148. Transport path 160 for filter rods F is defined between conveyor belts 158. The upper end of path 160 connects with the inside of receiving hopper 156. A pair of guides 162, defining the extension of path 160, are arranged between the lower end of path 160 and rollers 146, as required.

Thus, according to turnabout unit 140, as described above, each filter rod F delivered from paired accelerating rollers 132, is first fed into receiving trough 144 and guided in its movement through the trough. When the leading end portion of rod F projects from the leading end of trough 144, with respect to its transfer direction through trough 144, it is moved to the gap between delivery rollers 146 by the compressed air jetted from air nozzle 150. Since it is subjected to the force of inertia, however, the leading end of rod F cannot immediately be swallowed by rollers 146, thus allowing rod F to travel between said rollers. When the entire body of rod F comes into contact with rollers 146, it is taken into the gap between the rollers. As rollers 146 rotate, rod F is fed into path 160 between conveyor belts 158, by means of paired guides 162. Thus, after it is delivered from accelerating rollers 132, filter rod F is transported in the transverse direction; i.e. perpendicular to its former transport direction. More specifically, rod F, having so far been transported in its axial direction, is turned to its transverse direction, perpendicular to its axis. Since rods F are delivered intermittently from rollers 132, each rod F cannot adversely affect the turnabout action of its immediate predecessor. Thus, rods F, delivered intermittently from rollers 132, can be fed successively into path 160 between conveyors 158, through the gap between delivery rollers 146. As conveyors 158 are driven, rods F are transported through path 160, to be fed into receiving hopper 156 for storage. Thereafter, filter rods F in hopper 156 are supplied to a filter cigarette manufacturing machine (not shown).

Receiving hopper 156 is provided with limit switch 164, which opens when the number of filter rods F in the hopper reaches the maximum permissible value, and closes when the number reaches the minimum. In this embodiment, rods F in hopper 156 are blanketed with flexible cover 300, as seen from FIG. 11. Thus, when the number of rods F in hopper 156 reaches the maximum permissible value, rods F push up actuator 302 of switch 164, through the medium of cover 300, thereby opening the switch.

Figure 13:
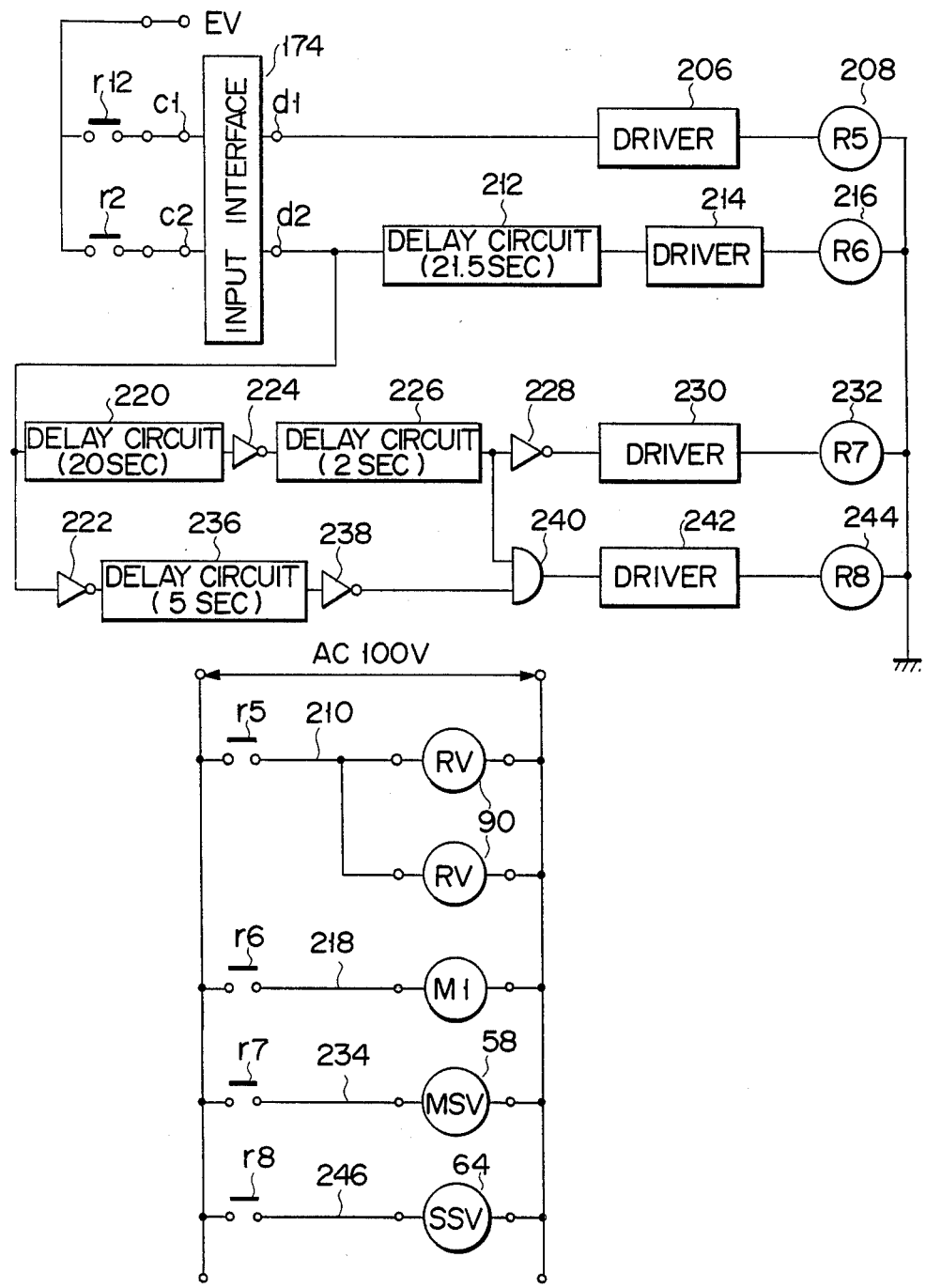

Referring now to FIGS. 12 and 13, these schematically show a control circuit for controlling the operation of the transport system. In FIG. 12, detecting switch 142 and limit switch 164 are connected to input terminals a1 and a2, respectively, of first input interface 166. Voltage EV can be applied to terminals a1 and a2 via switches 142 and 164, respectively. Interface 166 also has output terminals b1 and b2, corresponding to input terminals a1 and a2, respectively. Terminal b1 is connected to first relay 170 via driver 168. Relay 170 has first and second contacts r11 and r12. As is shown in FIG. 12, contact r11 is a normally-closed contact, which is provided in the middle of feeder line 172 for motor M2, in regulating mechanism 104. As is shown in FIG. 13, on the other hand, contact r12 is a normally-open contact, which is connected to input terminal c1 of second input interface 174.

Output terminal b2 of first input interface 166 is connected to second relay 184 via inverter 76, OR gate 178, inverter 180, and driver 182. The other input terminal of gate 178 is connected between output terminal b1 of interface 166 and driver 168 of first relay 170. Relay 184 has normally-open contact r2, which is connected to input terminal c2 of second input interface 174, as shown in FIG. 13. Voltage EV can be applied also to input terminals c1 and c2 of interface 174 via contacts r12 and r2, respectively.

The output terminal of inverter 176 is also connected to delay circuits 186 and 188. Circuit 186 is connected to third relay 196 via inverter 190, delay circuit 192, and driver 194. Relay 196 has normallyopen contact r3, which is provided between motor M2 and first contact r11 of first relay 170, in the middle of feeder line 172 for motor M2.

Delay circuit 188 is connected to fourth relay 202 via inverter 198 and driver 200. Relay 202 has normally-open contact r4, which is provided in the middle of feeder line 204 for accelerating motor M3, for accelerating rollers 132, as shown in FIG. 12. Line 204 diverges from feeder line 172 for motor M2, at a point between contacts r11 and r3.

Referring again to FIG. 13, second input interface 174 has output terminals d1 and d2, corresponding to input terminals c1 and c2, respectively. Terminal d1 is connected to fifth relay 208 through driver 206. Relay 208 has normally-open contact r5, which is provided in the middle of control line 210 for relief valves 90, as shown in FIG. 13. The two relief valves are operated simultaneously by opening or closing contact r5.

Output terminal d2 of second input interface 174 is connected to sixth relay 216 via delay circuit 212 and driver 214. Relay 216 has normally-open contact r6, which is provided in the middle of feeder line 218 for feed motor M1 of feeder unit 10.

Output terminal d2 of interface 174 is further connected to delay circuit 220 and inverter 222. Circuit 220 is connected to seventh relay 232 via inverter 224, delay circuit 226, inverter 228, and driver 230. Relay 232 has normally-open contact r7, which is provided in the middle of control line 234 for main solenoid valve (MSV) 58, in blower unit 16.

Inverter 222 is connected to eighth relay 244 via delay circuit 236, inverter 238, AND gate 240, and driver 242. Relay 244 has normally-open contact r8, which is provided in the middle of control line 246 for sub-solenoid valve (SSV) 64, in blower unit 16. The other input terminal of AND gate 240 is connected between delay circuit 226 and inverter 228.

Each of delay circuits used in the control circuit described above, operates only when a high-level signal is applied to it, it then delivering in turn, a high-level signal after a predetermined delay, following the signal input. The preset delay times for the individual delay circuits are entered in their corresponding blocks, indicative of the delay circuits, as shown in FIGS. 12 and 13.

Figure 14:
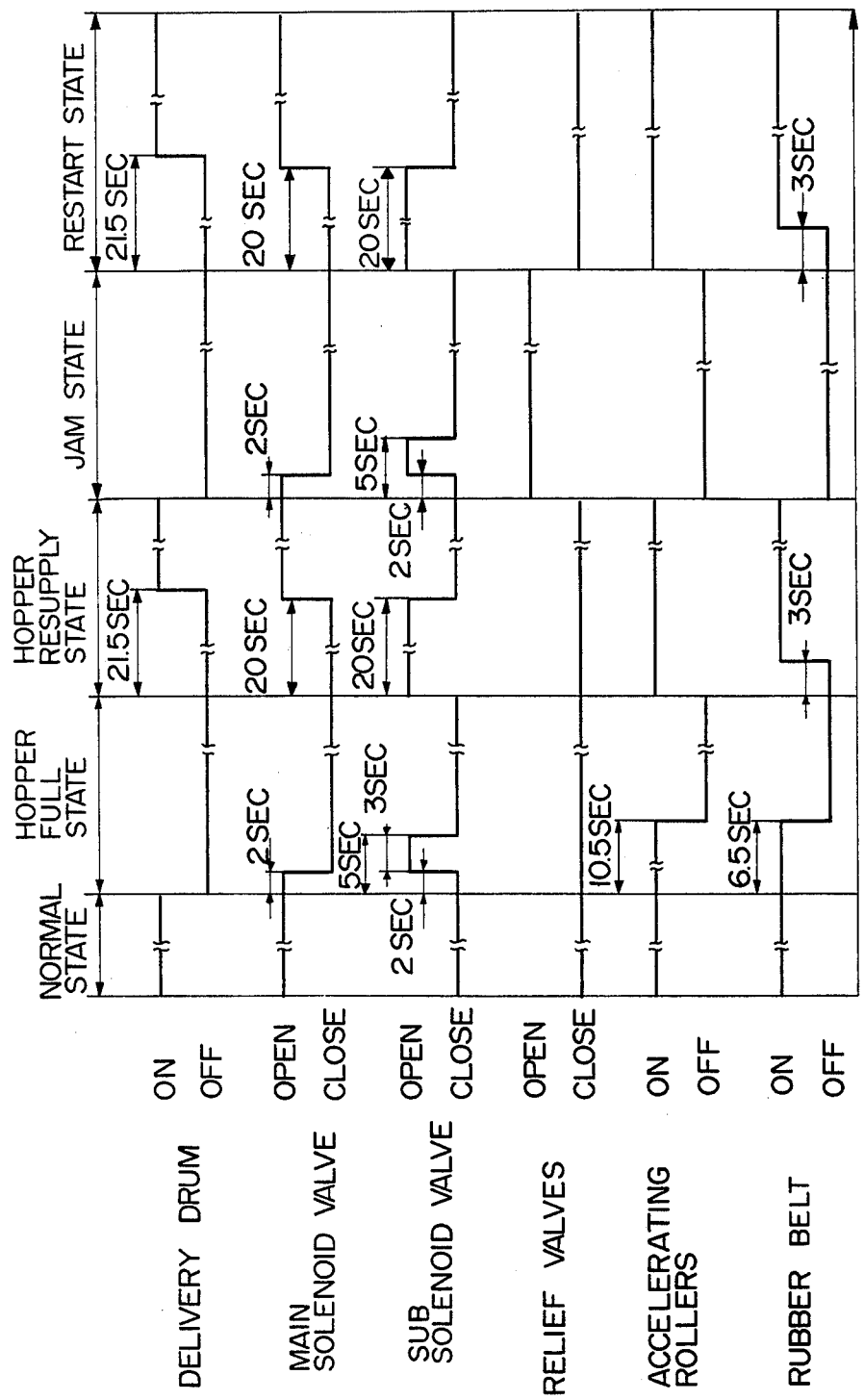
FIG. 14 is a diagram illustrating switching operations for various operating elements, in varied operating situations of the transport system of FIG. 1.

Referring also to FIG. 14, the operation of the aforementioned transport system will now be described.

First, the normal operating state of the transport system will be described. In the normal operating state, filter rods F flow smoothly through the transport trough, and there is sufficient room to receive them in receiving hopper 156 of receiving unit 12. In this state, therefore, detecting switch 142 is open, while limit switch 164 is closed.

If switches 142 and 164 are open and closed, respectively, low and high-level signals appear at output terminals b1 and b2 of first input interface 166, respectively. Since the low-level signal is applied to driver 168 of first relay 170, relay 170 cannot be actuated. Thus, first and second contacts r11 and r12 of relay 170 are closed and open, respectively. If contact r12 of relay 170 is open, driver 206 of fifth relay 208, like driver 168 of relay 170, is supplied with a low-level signal via output terminal d1 of second input interface 174, so that relay 208 is nonoperating. As a result, contact r5 of relay 208 is open, so that both relief valves 90 are closed.

Meanwhile, the high-level signal, appearing at output terminal b2 of first input interface 166, is transmitted to drivers 182, 194, and 200 of second, third, and fourth relays 184, 196, and 202. In this case, the high-level signal is applied to all of drivers 182, 194, and 200, as is shown in FIG. 12. Since two inverters are interposed between terminal b2 and driver 194, and between terminal b2 and driver 200, the high-level signal from terminal b2 is transmitted as it is, to drivers 194 and 200. The low-level signal from output terminal b1 is applied to one input terminal of OR gate 178, which is interposed between inverters 178 and 180. Also, a low-level version of the signal from terminal b2, transmitted through inverter 176, is applied to the other input terminal of gate 178. In this case, therefore, a low-level signal is delivered from the output terminal of gate 178. As a result, the signal transmitted through inverter 180 to driver 182, thereafter, is a high-level signal. Accordingly, drivers 182, 194, and 200 all drive their corresponding relays 184, 196, and 202, so that contacts r2, r3, and r4 are all closed. Thus, motor M2 of regulating mechanism 104 and accelerating motor M3, for accelerating rollers 132, both rotate.

If contact r2 of second relay 184 is closed, as aforesaid, a high-level signal appears at output terminal d2 of second input interface 174, as in the case of first input interface 166. The high-level signal from terminal d2 is applied to drivers 214 and 230 of sixth and seventh relays 216 and 232, so that drivers 214 and 230 drive relays 216 and 232, respectively. As a result, contacts r6 and r7 of relays 216 and 232 are both closed. Thus, feed motor M1 of feeder unit 10 rotates, and main solenoid valve 58 of blower unit 16 is opened.

If valve 58 is open, then sub-solenoid valve 64 is closed. In this state, a low-level signal is applied to driver 242 of eighth relay 244, owing to the existence of AND gate 240, so that driver 242 cannot drive relay 244. Thus, contact r8 of relay 244 is open, and valve 64, therefore, is closed.

As is evident from the above description, when the transport system is in the normal operating state, delivery drum 36, main solenoid valve 58, sub-solenoid valve 64, relief valves 90, accelerating rollers 132, and rubber belt 130 are all operating, as can be seen from FIG. 14. In this state, therefore, filter rods F are transported successively from feeder unit 10 toward receiving unit 12, through transport pipe 14, by the compressed air flowing through pipe 14. When received by unit 12, rods F are stored in receiving hopper 156.

Thereafter, when the number of filter rods F in receiving hopper 156 reaches the maximum permissible value, that is, when hopper 156 becomes full, limit switch 164 opens, as aforesaid. If switch 164 opens, second to seventh relays 184, 196, 202, 208, 216, and 232 all become nonoperating, so that the drive of motors M1, M2, and M3 is stopped, and main solenoid valve 58 is closed.

The operations of the motors and solenoid valves will now be described in further detail. When limit switch 164 is opened, the low-level signal appearing at output terminal b2 of first input interface 166, is transmitted immediately to driver 182 of second relay 184. Thus, the moment switch 164 is opened, relay 184 is turned off. Thereupon, contact r2 of relay 184 is opened, so that a low-level signal appears at output terminal d2 of second input interface 174. The low-level signal is transmitted to driver 214 of sixth relay 216 via delay circuit 212. In this case, the low-level signal from terminal d2 is applied directly to circuit 212, so that circuit 212 cannot function at all. Accordingly, when driver 214 of relay 216 immediately receives the low-level signal from terminal d2 of interface 174, it switches relay 216 to a nonoperating state. Thus, contact r6 of relay 216 is opened, so that the drive of feed motor M1 is stopped. In conclusion, as is evident from the above description, when limit switch 164 is opened, the drive of motor M1, and hence delivery drum 36, is stopped at once, as shown in FIG. 14.

The drive of motors M2 and M3 is stopped after predetermined delays, following the point of time when limit switch 164 is opened. In connection with motor M2, as shown in FIG. 12, two delay circuits 186 and 192 are arranged on the control line, between third relay 196 and output terminal b2 of first input interface 166. The high-level signal is applied only to circuit 186, of the two delay circuits. Therefore, the low-level signal, appearing at output terminal b1 of interface 166, is transmitted to driver 194 of relay 196, after a predetermined delay time, for example, 6.5 seconds, determined by circuit 186. As a result, the drive of motor M2 or rubber belt 130 is stopped after a delay of 6.5 seconds, following the interruption of the drive of delivery drum 36. Delay circuit 188, which is located between terminal b2 of interface 166 and driver 200 of fourth relay 202, serves for controlling accelerating motor M3. Thus, relay 202 is turned off after a delay of 10.5 seconds, determined by circuit 188, following the shutoff of sixth relay 216. In consequence, the drive of motor M3 and accelerating rollers 132 is stopped after a delay of 10.5 seconds, following the interruption of the drive of drum 36.

Main solenoid valve 58 is served by delay circuit 226 which, together with delay circuit 220, is arranged between output terminal d2 of second input interface 174 and driver 230 of seventh relay 232. Thus, relay 232 is turned off after a delay of 2 seconds, determined by circuit 226, following the shutoff of sixth relay 216. As a result, main solenoid valve 58 is closed after a delay of 2 seconds, following the interruption of the drive of delivery drum 36.

The moment valve 58 is closed in this manner, sub-solenoid valve 64 is opened by means of AND gate 240, in the middle of the control line for eighth relay 244. One input terminal of AND gate 240 is connected between delay circuit 226 and inverter 228, on the control line for seventh relay 232. Therefore, the moment relay 232 is turned off, a high-level signal is transmitted to the one input terminal of AND gate 240. On the other hand, the low-level signal from output terminal d2 of second input interface 174, is transmitted to the other input terminal of AND gate 240. This transmission of the low-level signal is delayed by 5 seconds, by delay circuit 236 in the middle of the control line for eighth relay 244. Thus, before the low-level signal is transmitted to the other input terminal of AND gate 240, the high-level signal which is transmitted when the transport system is in the normal state, that is, when contact r2 of second relay 184 is closed, is maintained at the other input terminal. Thus, when seventh relay 232 is turned off, so that the high-level signal is transmitted from the control line for relay 232 to the one input terminal of AND gate 240, the high-level signal is transmitted to both input terminals of AND gate 240. Accordingly, a high-level signal is transmitted from the output terminal of AND gate 240 to driver 242 of eighth relay 244, so that relay 244 is actuated. As a result, contact r8 of relay 244 is closed, so that sub-solenoid valve 64 is opened. After valve 64 is opened, however, if the low-level signal is transmitted to the other input terminal of AND gate 240, after a delay determined by delay circuit 236, a low-level signal is transmitted from the output terminal of AND gate 240 to relay 244. Thus, relay 244 is turned off again, so that valve 64 is closed. The open period for valve 64 is determined by the difference between the delay times set by delay circuits 226 and 236. In this embodiment, the valve-open period is 3 seconds. FIG. 14 shows how the operations of the aforementioned elements are switched.

When limit switch 164 is opened, after receiving hopper 156 becomes full, as described earlier, the drive of delivery drum 36 in feeder unit 10, is stopped immediately. In other words, the delivery of filter rods F from unit 10 is stopped at once. The moment main solenoid valve 58 is closed, after a delay of 2 seconds, following the interruption of the drive of drum 36, sub-solenoid valve 64 is opened. In 3 seconds thereafter, solenoid 64 is closed again. Thus, the feed of compressed air into transport pipe 14 is stopped by closing valve 58 not immediately after, but after a delay of 2 seconds, following the stoppage of the delivery of rods F from unit 10. Therefore, the filter rods delivered from unit 10 into pipe 14 immediately before the end of the compressed air feed, cannot be sucked back toward unit 10, which is on the low-pressure side after valve 58 is closed. In this manner, rods F can be prevented from jamming feeder unit 10, due to being sucked back.

The moment main solenoid valve 58 is closed, moreover, sub-solenoid valve 64 is opened. For 3 seconds thereafter, transport pipe 14 is supplied with compressed air which, lower in volume than the air fed through valve 58, is throttled by throttle valve 66, after flowing through valve 64. Accordingly, the speed of transport of filter rods F located in pipe 14, is quickly but gently reduced, so that the rods can be prevented from impacting violently against one another in the pipe.

Meanwhile, the drive of rubber belt 130 in regulating mechanism 104, is stopped in sufficient time for filter rods F in transport pipe 14 to cease being transported, after the delivery of rods F from feeder unit 10 is interrupted. In this embodiment, this delay time is 6.5 seconds. While belt 130 is running, therefore, rods F from pipe 14, received in transport trough 96 of mechanism 104, can be discharged completely from the trough, without staying therein. As can be seen from FIG. 14, moreover, the drive of accelerating rollers 132 is stopped after the interruption of the drive of belt 130. Therefore, rods F, discharged from trough 96, are fed Securely to turnabout unit 140, by rollers 132. Thus, after receiving hopper 156 becomes full, none of rods F stay in the transport path between pipe 14 and rollers 132.

When filter rods F, having so far filled up receiving hopper 156, are reduced to the minimum permissible quantity, thus requiring replenishment of hopper 156, limit switch 164 is closed. When switch 164 is closed in this manner, second to eighth relays 184, 196, 202, 208, 216, 232, and 244 are actuated, as mentioned earlier. As a result, delivery drum 36, main solenoid valve 58, sub-solenoid valve 64, accelerating rollers 132, and rubber belt 130 are restored to the aforementioned normal state. However, delay circuit 212, in the middle of the control line for sixth relay 216, provides a delay of 21.5 seconds before the start of the drive of drum 36, after switch 164 is closed. Valve 58 is opened after a delay of 20 seconds, preset by delay circuit 220 in the middle of the control line for seventh relay 232, following the closing of switch 164. On the other hand, the high-level signal, which is in connection with valve 64 at the point of time when switch 164 is closed, is maintained at the one input terminal of AND gate 240, in the middle of the control line for eighth relay 244. At the same time, the highlevel signal, from output terminal d2 of second input interface 174, is transmitted immediately to the other input terminal of AND gate 240. Thus, the moment switch 164 is closed, relay 244 is actuated, so that valve 64 is opened. Thereafter, when the low-level signal is transmitted from the control line for relay 232 to the one input terminal of AND gate 240, after the delay of 20 seconds determined by delay circuit 220, a low-level signal is delivered from the output terminal of AND gate 240. As a result, relay 244 is turned off, so that valve 64 is closed again. In this case, therefore, the moment main solenoid valve 58 is opened in the aforesaid manner, sub-solenoid valve 64 is closed.

For controlling accelerating motor M3 or accelerating rollers 132, at this point of time, the low-level signal is applied to delay circuit 188, in the middle of the control line for fourth relay 202, so that circuit 188 cannot function. Thus, the moment limit switch 164 is closed, relay 202 and hence, accelerating rollers 132, are actuated. For motor M2 and rubber belt 130, on the other hand, only delay circuit 192, out of delay circuits 186 and 192 in the middle of the control line for third relay 196, functions. Accordingly, relay 196 and rubber belt 130 is actuated after a delay of 3 seconds, preset by circuit 192, following the closing of switch 164. When receiving hopper 156 is in need of resupply of filter rods F, the operations of the aforementioned individual elements are switched, in the manners shown in FIG. 14.

Thus, when hopper 156 comes to require replenishment, accelerating rollers 132 and sub-solenoid valve 64 are actuated and opened, respectively, whereupon rubber belt 130 starts to be driven. Accordingly, a relatively small quantity of compressed air is fed into transport pipe 14 through valve 64, resulting in all the filter rods F remaining in pipe 14 are carried toward receiving unit 12. Then, rods F are fed to turnabout unit 140 by belt 130 and rollers 132 of unit 12. Since the transport of rods F in pipe 14 is effected by a relatively small current of compressed air, all the rods can be discharged from transport pipe 14 without impacting violently against one another.

After all of filter rods F are discharged from transport pipe 14, sub-solenoid valve 64 is closed, whereupon main solenoid valve 58 is opened. As a result, a relatively large quantity of compressed air is fed into pipe 14. After valve 58 is opened, delivery drum 36 of feeder unit 10 is actuated. Accordingly, filter rods F, delivered successively from drum 36, are transported smoothly toward receiving unit 12 through pipe 14, by a relatively large current of compressed air, previously fed into pipe 14. Thus, the transport system is restored to the normal state.

If filter rods F jam in the transport system, between turnabout unit 140 and accelerating rollers 132, while the system is operating in the normal state, such a jam is detected by detecting switch 142. In other words, switch 142 is closed. Thereupon, a high-level signal appears at output terminal b1 of first input interface 166, so that first relay 170 is actuated, and fifth relay 208 is also actuated without delay. Thus, contact r5 of relay 208 is closed, so that both relief valves 90 are opened at once. As relay 170 operates, moreover, its first contact r11 is opened. The moment switch 142 is opened, therefore, motor M2 and accelerating motor M3, that is, rubber belt 130 and accelerating rollers 132, cease to be driven.

Detecting switch 142, in connection with feed motor M1 or delivery drum 36 of feeder unit 10, is opened, and the high-level signal, appearing at output terminal b1 of first input interface 166, is transmitted not only to driver 168 of first relay 170, but also to the one input terminal of OR gate 178, in the middle of the control line for second relay 184. At this time, limit switch 164 is closed, so that a high-level signal appears at output terminal b2 of interface 166. Accordingly, a low-level signal is transmitted to the other input terminal of gate 178 via inverter 176. As a result, a high-level signal is delivered from the output terminal of gate 178. This signal is inverted into a low-level signal by inverter 180, and the inverted version is transmitted to driver 182 of second relay 184. Thus, relay 184 is turned off, and its contact r2 is opened. Thereupon, a low-level signal is transmitted immediately to driver 214 of sixth relay 216, through second input interface 174, so that relay 216 is turned off. As a result, contact r6 of relay 216 is opened, so that the drive of feed motor M1, and hence of delivery drum 36, is stopped. Thus, the moment detecting switch 142 is opened, the drive of drum 36 is stopped.

If contact r2 of second relay 184 is opened in the aforesaid manner, moreover, solenoid valves 58 and 64 are switched, in the same manner as in the case where receiving hopper 156 of the transport system becomes full. Thus, the moment valve 58 is closed, 2 seconds after the opening of detecting switch 142, valve 64 is opened. Three seconds after this, valve 64 is closed again. When the transport system is jammed as aforesaid, the operations of the individual elements are switched in the manner shown in FIG. 14.

If filter rods F cause such a jam in their transport path, the drive of delivery drum 36 of feeder unit 10, accelerating rollers 132, and rubber belt 130 are immediately stopped first, whereupon both relief valves 90 are opened without delay, as can be seen from FIG. 14. In this embodiment, valves 90 are attached to the portion of transport pipe 14 nearer to receiving unit 12 than to feeder unit 10. Accordingly, that portion of pipe 14 on the lower-course side of valves 90 is relatively short. If valves 90 are opened, therefore, the pressure of the compressed air for the transport of filter rods F, can be lowered drastically at the lower-course portion of pipe 14. Thus, the transport of rods F located in the lower-course portion of pipe 14, can be stopped immediately, without causing the rods to impact against one another.

On the upper-course side of the transport path, with respect to relief valves 90, the compressed air continues to be fed into transport pipe 14, through main solenoid valve 58, for 2 seconds after valves 90 are opened. Even after valve 58 is closed, moreover, sub-solenoid valve 64 is open for 3 seconds. As in the case where receiving hopper 156 is full, therefore, the transport of filter rods F, located in the upper-course portion of the transport path, can be stopped gently, thus preventing the rods from being damaged by impacting against one another.

If the jam is removed from the transport system, and when detecting switch 142 is opened again for the restart of the system, the operations of the individual elements of the system are controlled in the same manner as in the case where receiving hopper 156 is in need of replenishment, as shown in FIG. 14.

What is claimed is:
1. A receiving/delivering apparatus for rodshaped objects transported lengthwise in an air current, comprising:
(a) an elongated transport trough having a horizontal axis, the transport trough being provided with a guide groove which is open at an upper section and at first and second ends of the transport trough, the guide groove receiving the rod-shaped objects from the first end and guiding the rod-shaped objects lengthwise;
(b) braking/transportation means, located above the guide groove, for providing the rod-shaped objects with a braking force when they are about to be guided through the guide groove and for transporting the rod-shaped objects at a first constant speed from the first end to the second end, the braking/transportation means including:
(i) a driving pulley located above the guide groove;

(ii) a first driven pulley located above the guide groove but lower than the driving pulley, the first driven pulley being situated upstream of the driving pulley with respect to a transportation direction in which the rod-shaped objects are transported;

(iii) a second driven pulley located between the first driven pulley and the driving pulley;

(iv) an endless rubber belt stretched between the driving pulley and the first driven pulley while being wound around the second driven pulley, the endless rubber belt being situated right above the guide groove and having a braking belt portion extending parallel to the guide groove between the first and second driven pulleys; and (v) driving means for rotating the driving pulley, to thereby move the braking belt portion in the transportation direction, whereby the rod-shaped objects which are received in the guide groove and are about to move along the guide groove are provided with the braking force by being brought into contact with the braking belt portion and are then transported from the first end to the second end at the first constant speed determined by a traveling speed of the braking belt portion;

(c) accelerating means, located in the vicinity of the second end of the transport trough, for accelerating movement of the rod-shaped objects when they are being delivered from the second end of the guide groove, the accelerating means including:

(i) a pair of accelerating rollers vertically sandwiching an axis of the guide groove and respectively including axes perpendicular to the axis of the guide groove, the accelerating rollers being rotated in opposite directions at a peripheral speed higher than the traveling speed of the braking belt portion of the rubber belt; and (ii) an accelerating path, located between the accelerating rollers to be coaxial with the axis of the guide groove, for allowing passage of the rod-shaped objects, the accelerating path being spaced from the second driven roller by a distance slightly greater than the length of the rod-shaped objects, whereby movement of the rod-shaped objects entering the acceleration path being accelerated by rotation of the accelerating rollers such that the rod-shaped objects are delivered from the accelerating path at a second speed higher than the first speed; and (d) lift-preventing means, located between the second driven roller and the accelerating rollers, for preventing leading ends of the rod-shpaed objects, as viewed in the transportation direction, from lifting, thereby enabling the rod-shaped objects to be transported from the second driven pulley to the accelerating rollers along the guide groove by the traveling of the braking belt portion, the lift-preventing means including a rubber belt portion located right above the guide groove and extending from the second driven pulley to the driving pulley, the rubber belt portion being slanted upward at a predetermined angle.

2. The apparatus according to claim 1, wherein the bottom face of the guide groove, at an open end portion on the upper-course side thereof with respect to the transportation direction, declines toward the upper-course side.

3. The apparatus according to claim 2, wherein both of two opposite inner side faces of the guide groove, at the end portion on the upper-course side thereof with respect to the transportation direction, are inclined so that the distance between the inner side faces decreases with distance from the upper-course end of the guide groove.

4. The apparatus according to claim 1, wherein the regulating means further includes first adjusting means for moving the first and second driven pulleys toward or away from the guide groove, for adjustment purposes.

5. The apparatus according to claim 4, wherein the regulating means further includes second adjusting means for moving the first driven pulley in the longitudinal direction of the guide groove, for adjustment purposes.

6. The apparatus according to claim 1, wherein the first and second driven pulleys have the same diameter.

7. The apparatus according to claim 6, wherein the accelerating rollers are provided with a V-shaped groove formed along their circumferential surfaces, the accelerating path being defined between the V-shaped grooves of the accelerating rollers.

8. The apparatus according to claim 7, wherein the rod-shaped objects have outer surfaces elastically deformable.

9. The apparatus according to claim 8, wherein the rod-shaped objects are filter rods for use in making cigarettes.

* * * * *